US011655056B2

(12) United States Patent
Kitamura et al.

(10) Patent No.: US 11,655,056 B2
(45) Date of Patent: May 23, 2023

(54) ORIENTATION CONTROL DEVICE, SATELLITE, ORIENTATION CONTROL METHOD, AND PROGRAM

(71) Applicant: Mitsubishi Electric Corporation, Tokyo (JP)

(72) Inventors: Kenji Kitamura, Tokyo (JP); Takeya Shima, Tokyo (JP); Katsuhiko Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 17/263,552

(22) PCT Filed: Sep. 13, 2019

(86) PCT No.: PCT/JP2019/036029
§ 371 (c)(1),
(2) Date: Jan. 27, 2021

(87) PCT Pub. No.: WO2020/059649
PCT Pub. Date: Mar. 26, 2020

(65) Prior Publication Data
US 2021/0245901 A1   Aug. 12, 2021

(30) Foreign Application Priority Data

Sep. 21, 2018 (JP) .............................. JP2018-177919

(51) Int. Cl.
*B64G 1/40* (2006.01)
*B64G 1/24* (2006.01)
*B64G 1/44* (2006.01)

(52) U.S. Cl.
CPC .............. *B64G 1/244* (2019.05); *B64G 1/40* (2013.01); *B64G 1/443* (2013.01); *B64G 2001/247* (2013.01)

(58) Field of Classification Search
CPC .... B64G 1/244; B64G 1/40; B64G 2001/247; B64G 1/363
See application file for complete search history.

(56) References Cited

U.S. PATENT DOCUMENTS

| 6,116,543 A | 9/2000 | Koppel |
| 6,186,446 B1 | 2/2001 | Tilley et al. |

(Continued)

FOREIGN PATENT DOCUMENTS

| EP | 1059231 A2 * | 12/2000 | ............. B64G 1/007 |
| EP | 1 059 231 A3 | 9/2001 | |

(Continued)

OTHER PUBLICATIONS

Extended European Search Report dated Oct. 14, 2021 in European Application No. 19863349.7.

(Continued)

*Primary Examiner* — Tien Q Dinh
*Assistant Examiner* — Katherine June Bolek
(74) *Attorney, Agent, or Firm* — Xsensus LLP (57) ABSTRACT

An attitude control apparatus (20) includes an ideal thrust direction calculator (22), an ideal attitude calculator (24), a target attitude calculator (26), and a torque calculator (28). The ideal thrust direction calculator (22) calculates an ideal thrust direction of a thruster. The target attitude calculator (26) calculates a target attitude that is the attitude of a satellite in which a deviation from an ideal attitude is minimized within a movement limitation of an attitude control actuator (14) while a panel surface faces the sun. The torque calculator (28) calculates a torque for turning the satellite from an actual attitude to the target attitude and transmits a torque instruction to the attitude control actuator (14).

20 Claims, 5 Drawing Sheets

(56) References Cited

U.S. PATENT DOCUMENTS

| | | | |
|---|---|---|---|
| 7,113,851 B1 | 9/2006 | Gelon et al. | |
| 7,464,898 B1 * | 12/2008 | Goodzeit | B64G 1/363 |
| | | | 701/4 |
| 8,763,957 B1 | 7/2014 | Higham et al. | |
| 2004/0140401 A1 * | 7/2004 | Yamashita | B64G 1/286 |
| | | | 244/165 |
| 2016/0376033 A1 | 12/2016 | Ho et al. | |

FOREIGN PATENT DOCUMENTS

| | | |
|---|---|---|
| JP | 5-155398 A | 6/1993 |
| JP | 2001-18899 A | 1/2001 |

OTHER PUBLICATIONS

International Search Report and Written Opinion dated Nov. 12, 2019, received for PCT Application PCT/JP2019/036029, Filed on Sep. 13, 2019, 7 pages including English Translation.

* cited by examiner

ORIENTATION CONTROL DEVICE, SATELLITE, ORIENTATION CONTROL METHOD, AND PROGRAM

CROSS-REFERENCE TO RELATED APPLICATIONS

The present application is based on PCT filing PCT/JP2019/036029, filed Sep. 13, 2019, which claims priority to JP 2018-177919, filed Sep. 21, 2018, the entire contents of each are incorporated herein by reference.

TECHNICAL FIELD

The present disclosure relates to an attitude control apparatus for controlling the attitude of a satellite, a satellite, a method of controlling attitude, and a program.

BACKGROUND ART

A geostationary satellite is separated from a rocket and introduced into an orbit, such as low earth orbit (LEO), geostationary transfer orbit (GTO), or super synchronous orbit (SSO). The geostationary satellite then causes firing of a thruster mounted thereon and thus obtains a thrust, thereby shifting from the initial orbit, into which the geostationary satellite has been introduced, to the geostationary earth orbit (GEO). Examples of the thruster include a chemical thruster and an electric propulsion thruster. The chemical thruster can generate a greater thrust, and therefore requires a shorter time for orbit transfer from the GTO to the GEO but requires a higher propellant consumption, in comparison to the electric propulsion thruster. In contrast, the electric propulsion thruster requires a longer time for orbit transfer from the GTO to the GEO but requires a lower propellant consumption, which means a higher specific impulse, in comparison to the chemical thruster.

In either case of the chemical thruster and the electric propulsion thruster, in order to shorten the time required for orbit transfer while reducing the propellant consumption during the orbit transfer, the thrust direction of the thruster should extend in a direction appropriate for transfer of the satellite to the target orbit. In addition, in order to cause firing of the thruster, the panel surface of a solar array panel (SAP) for generating electric power to be fed to the thruster should face the direction of the sun. In view of these requirements, some satellites are equipped with attitude control apparatuses that control the attitudes of the satellites during orbit transfer. An example of these attitude control apparatuses is disclosed in Patent Literature 1. The attitude control apparatus disclosed in Patent Literature 1 controls the attitude of a satellite so as to make the panel surface of a SAP orthogonal to the sun vector and make the thrust vector orthogonal to the rotational axis of the SAP.

CITATION LIST

Patent Literature

Patent Literature 1: Unexamined Japanese Patent Application Publication No. 2001-18899

SUMMARY OF INVENTION

Technical Problem

The mechanical attitude control of the satellite is executed by attitude control actuators installed in the satellite. Unfortunately, the attitude control apparatus disclosed in Patent Literature 1 controls the attitude of the satellite regardless of the movement limitation of the attitude control actuators. This configuration may lead to a problem that the actual attitude of the satellite cannot follow the target attitude of the satellite. The panel surface of the SAP therefore fails to face the direction of the sun, resulting in a reduction in power generation efficiency of the SAP. The similar problems arise not only in a geostationary satellite but also in a non-geostationary satellite, which shifts from the initial orbit to a geocentric orbit.

An objective of the present disclosure, which has been accomplished in view of the above situations, is to provide an attitude control apparatus, a satellite, a method of controlling attitude, and a program, that can prevent a reduction in power generation efficiency of a SAP during orbit transfer.

Solution to Problem

In order to achieve the above objective, an attitude control apparatus according to the present disclosure includes an ideal thrust direction calculator, an ideal attitude calculator, a target attitude calculator, and a torque calculator. The ideal thrust direction calculator acquires the position of a satellite including a thruster and a solar panel having a panel surface rotatable about a rotational axis, and calculates an ideal thrust direction that is a thrust direction of the thruster for minimizing a propellant consumption in firing of the thruster during transfer of the satellite to a target orbit. The ideal attitude calculator calculates an ideal attitude that is the attitude of the satellite in which the panel surface faces the sun while the thrust direction aligns with the ideal thrust direction. The target attitude calculator acquires a movement limitation of an attitude control actuator for controlling an attitude of the satellite mechanically, and calculates a target attitude that is an attitude of the satellite in which a deviation from the ideal attitude is minimized within the movement limitation while the panel surface faces the sun. The torque calculator acquires an actual attitude that is an attitude of the satellite, calculates a torque for turning the satellite from the actual attitude to the target attitude, and transmits a torque instruction indicating the calculated torque to the attitude control actuator.

Advantageous Effects of Invention

The attitude control apparatus according to the present disclosure calculates the target attitude that is the attitude of the satellite in which a deviation from the ideal attitude is minimized within the movement limitation of the attitude control actuator while the panel surface faces the sun. Since the torque instruction indicating the torque for turning the satellite from the actual attitude to the target attitude is transmitted to the attitude control actuator, the configuration can make the attitude of the satellite coincide with the target attitude and thus prevent a reduction in power generation efficiency of the SAP during the orbit transfer.

DESCRIPTION OF EMBODIMENTS

An attitude control apparatus according to embodiments of the disclosure is described in detail with reference to the drawings. Components that are the same or equivalent are assigned the same reference signs throughout the drawings.

Embodiment 1

Figure 1:
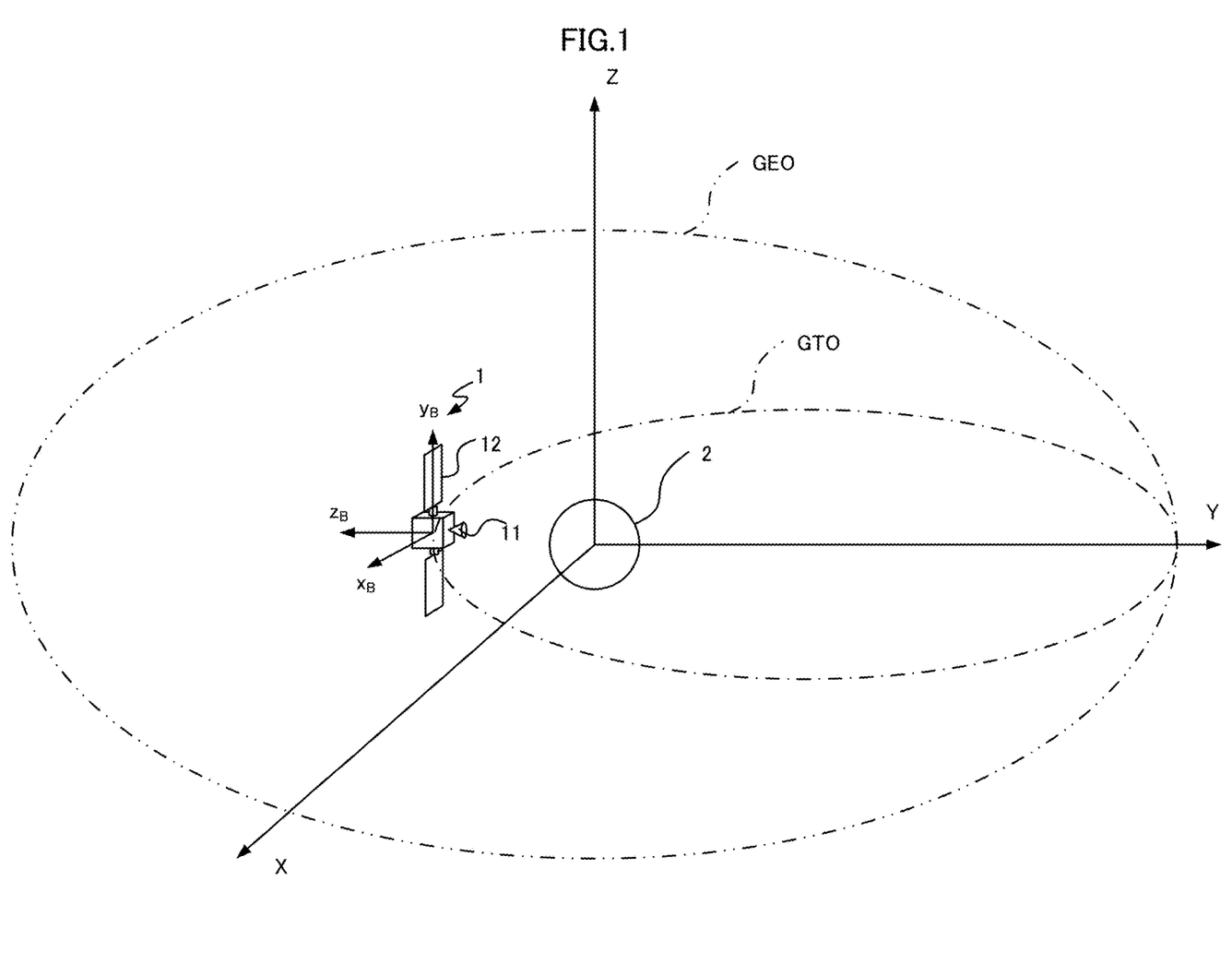
FIG. 1 illustrates a geostationary satellite according to Embodiment 1 of the present disclosure.

An attitude control apparatus according to Embodiment 1 is described focusing on an exemplary attitude control apparatus that is installed in a geostationary satellite, which is an exemplary satellite, and controls the attitude of the geostationary satellite during transfer from the initial orbit, into which the geostationary satellite has been introduced, to a geostationary earth orbit (GEO) that is a target orbit. The geostationary satellite 1 illustrated in FIG. 1 is separated from a rocket and introduced into a geostationary transfer orbit (GTO). The geostationary satellite 1 then causes firing of a thruster 11 that is an electric propulsion thruster to obtain a thrust, and thereby shifts from the GTO to the GEO. The thruster 11 indicates a main thruster, such as ion thruster or plasma thruster. The following description of attitude control for the geostationary satellite 1 defines a geocentric inertial coordinate system having an earth 2 at the center and having the X axis, the Y axis, and the Z axis, and refers to the coordinate system as required, in order to facilitate an understanding. In this geocentric inertial coordinate system, the Z axis extends through the earth 2 from the South Pole to the North Pole, the X axis extends in the direction of vernal equinox, and the Y axis is orthogonal to each of the Z and X axes.

Figure 2:
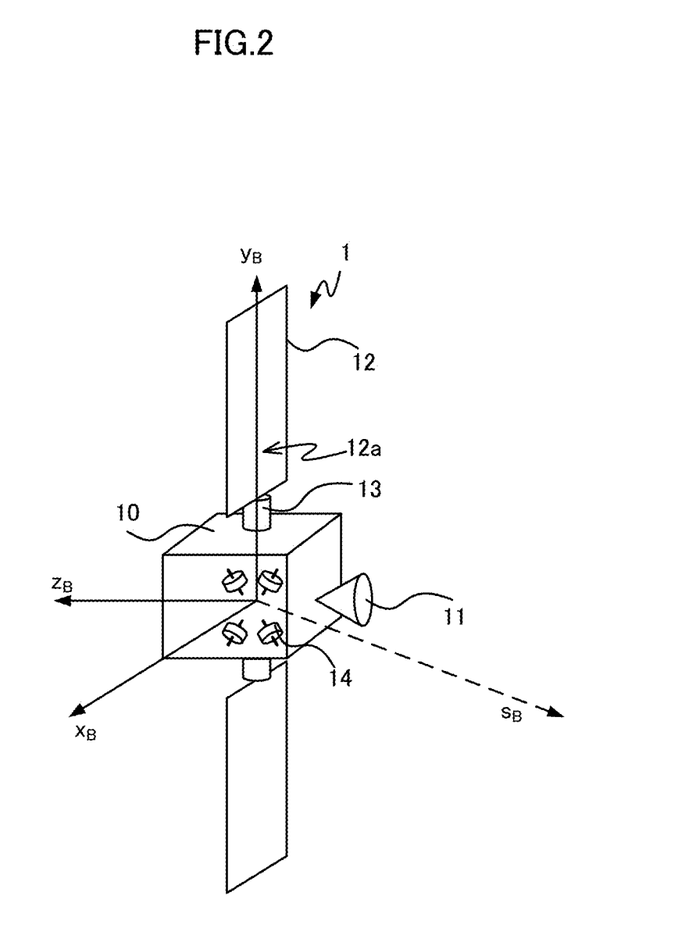
FIG. 2 illustrates a configuration of the geostationary satellite according to Embodiment 1.

As illustrated in FIG. 2, the description also defines a satellite coordinate system fixed to the geostationary satellite 1 and having the $x_B$ axis, the $y_B$ axis, and the $z_B$ axis, and refers to the coordinate system as required. In this satellite coordinate system, the $z_B$ axis coincides with the thrust direction of the thruster 11 included in the geostationary satellite 1, the $y_B$ axis coincides with the rotational axis of a solar panel 12 included in the geostationary satellite 1, and the $x_B$ axis is orthogonal to each of the $z_B$ and $y_B$ axes. The geostationary satellite 1 includes a housing 10, the thruster 11 mounted on the housing 10, the solar panel 12, a support member 13 mounted on the housing 10 and configured to support the solar panel 12 such that the solar panel 12 is rotatable about the $y_B$ axis, and attitude control actuators 14 that control the attitude of the geostationary satellite 1 mechanically. The thruster 11 is mounted on the housing 10 while the thrust direction is fixed relative to the housing 10. In the satellite coordinate system defined as illustrated in FIG. 2, the firing of the thruster 11 exerts a thrust on the geostationary satellite 1 in the positive $z_B$ axis direction. In order to adjust the direction of the thrust exerted on the geostationary satellite 1, the attitude of the geostationary satellite 1 is to be controlled, because of the thrust direction of the thruster 11 fixed relative to the housing 10. The four attitude control actuators 14 that control the attitude of the geostationary satellite 1 mechanically are accommodated in the housing 10. Examples of the attitude control actuators 14 include reaction wheels and control moment gyros.

Although not illustrated in FIG. 2, the geostationary satellite 1 also includes an attitude control apparatus accommodated in the housing 10. The attitude control apparatus electrically controls the attitude control actuators 14. The attitude control apparatus calculates an ideal attitude that is the attitude of the geostationary satellite 1 in which the thrust direction of the thruster 11 aligns with the optimum direction for minimizing the propellant consumption during the transfer from the GTO to the GEO while the panel surface 12a of the solar panel 12 is orthogonal to a unit vector $s_B$ indicating the direction of the sun represented by the dashed arrow in FIG. 2, as explained in detail later. The attitude control apparatus then calculates a target attitude having a minimum deviation from the ideal attitude, in view of a movement limitation of the attitude control actuators 14. The attitude control apparatus then acquires an actual attitude that is the attitude of the geostationary satellite 1, calculates a torque for turning the geostationary satellite 1 from the actual attitude to the target attitude, and transmits a torque instruction indicating the calculated torque to the attitude control actuators 14. On the basis of this torque instruction, the attitude control actuators 14 control the attitude of the geostationary satellite 1 mechanically.

During the transfer from the GTO to the GEO, anon-illustrated thruster controller causes firing of the thruster 11 at a constant discharge amount. The firing of the thruster 11 at a constant discharge amount generates a constant thrust exerted on the geostationary satellite 1 during the transfer from the GTO to the GEO.

Figure 3:
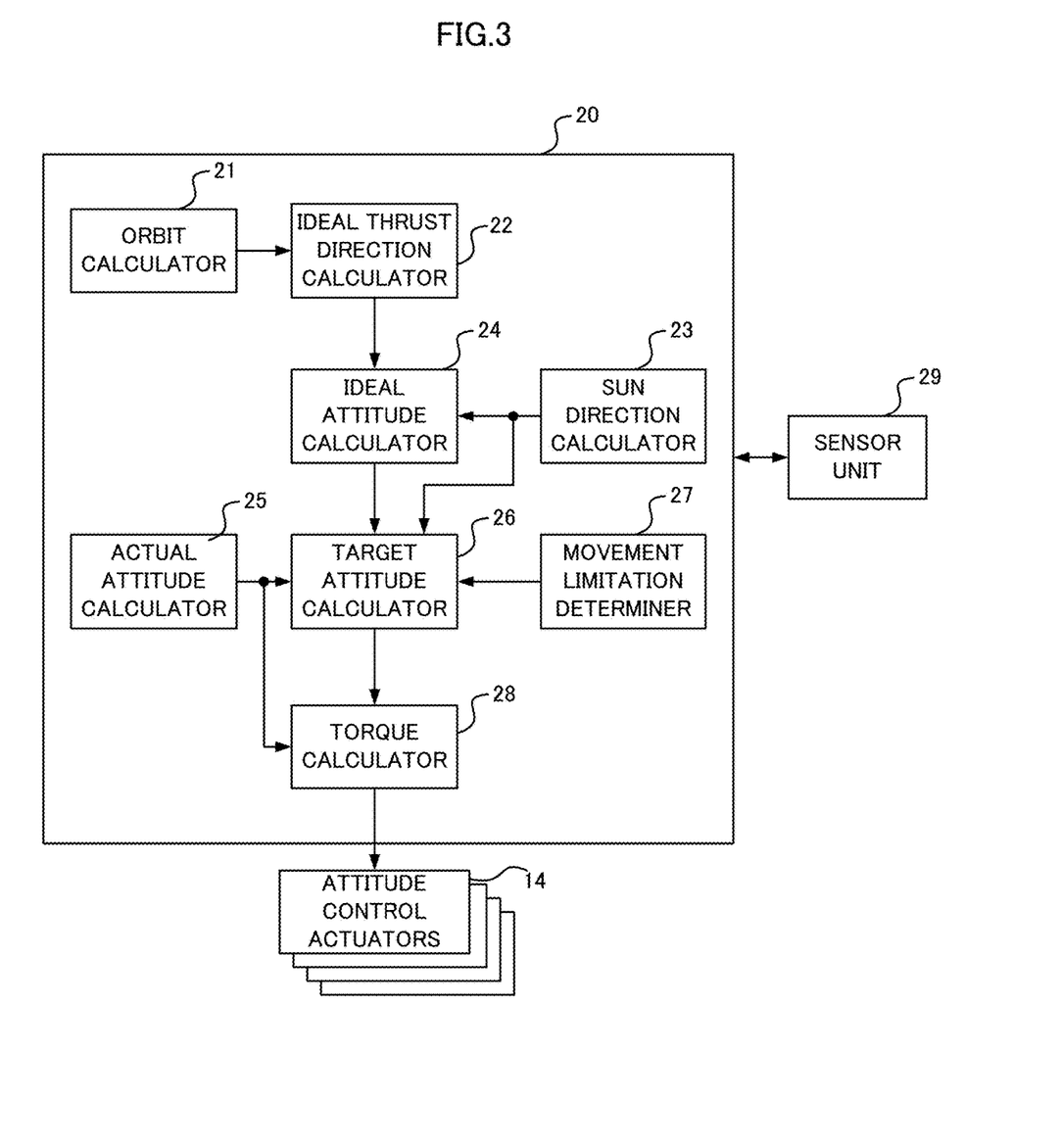
FIG. 3 is a block diagram illustrating a configuration of an attitude control apparatus according to Embodiment 1.

The following description is directed to an attitude control apparatus 20, which directs the thrust direction of the thruster 11 to the optimum direction for minimizing the propellant consumption during the transfer from the GTO to the GEO while a constant thrust is exerted as explained above. With reference to FIG. 3, the attitude control apparatus 20 includes an orbit calculator 21 that calculates osculating orbit elements of the current orbit of the geostationary satellite 1, an ideal thrust direction calculator 22 that calculates an ideal thrust direction of the thruster 11, a sun direction calculator 23 that calculates a direction of the sun as viewed from the geostationary satellite 1, an ideal attitude calculator 24 that calculates an ideal attitude of the geostationary satellite 1, an actual attitude calculator 25 that calculates an actual attitude that is the attitude of the geostationary satellite 1 in real-time, a target attitude calculator 26 that calculates a target attitude that is the attitude of the geostationary satellite 1 to be achieved, a movement limitation determiner 27 that determines conditions of the movement limitation of the attitude control actuators 14, and a torque calculator 28 that calculates a torque on the basis of the target attitude and transmits a torque instruction to the attitude control actuators 14.

The ideal thrust direction indicates the optimum thrust axis of the thruster 11 for minimizing the propellant consumption during the transfer from the orbit including the geostationary satellite 1 to the GEO and minimizing the time required for the transfer. The ideal attitude is the attitude of the geostationary satellite 1 in which the panel surface 12a faces the sun while the $z_B$ axis aligns with the ideal thrust direction. The ideal attitude is preferably the attitude of the geostationary satellite 1 in which the $y_B$ axis extends in the direction orthogonal to the unit vector $s_B$ while the $z_B$ axis aligns with the ideal thrust direction. The target attitude is the attitude of the geostationary satellite 1 in which a deviation from the ideal attitude is minimized within the movement limitation of the attitude control actuators 14 while the panel surface 12a faces the sun. The target attitude is preferably the attitude of the geostationary satellite 1 in which a deviation from the ideal attitude is minimized within the movement limitation of the attitude control actuators 14 while the $y_B$ axis extends in the direction orthogonal to the unit vector $s_B$.

The orbit calculator 21 calculates an instantaneous position of the geostationary satellite 1 on the basis of the signal acquired from a global positioning system (GPS) receiver installed in the geostationary satellite 1, and acquires an instantaneous velocity of the geostationary satellite 1 from a speed sensor included in a sensor unit 29. The speed sensor calculates the velocity of the geostationary satellite 1, for example, on the basis of the wave from a ground station that communicates with the geostationary satellite 1. The orbit calculator 21 then calculates osculating orbit elements, which are parameters for specifying the orbit along which the geostationary satellite 1 travels, on the basis of the instantaneous position of the geostationary satellite 1 and the instantaneous velocity of the geostationary satellite 1.

The ideal thrust direction calculator 22 calculates an ideal thrust direction that is the optimum thrust axis of the thruster 11 for minimizing the propellant consumption during the transfer to the GEO from the orbit including the geostationary satellite 1 and specified by the osculating orbit elements calculated by the orbit calculator 21. In detail, the ideal thrust direction calculator 22 calculates weight coefficients on the basis of the difference of the osculating orbit elements calculated by the orbit calculator 21 from target orbit elements, and calculates the sum of the results of multiplication of the direction vectors providing the maximum change rates of the individual orbit elements by the weight coefficients, thereby calculating the ideal thrust direction in the satellite coordinate system for minimizing the propellant consumption.

The sun direction calculator 23 calculates a direction of the sun as viewed from the geostationary satellite 1. In detail, the sun direction calculator 23 acquires a signal from a sun sensor included in the sensor unit 29, and calculates a unit vector $s_B$ indicating the direction of the sun in the satellite coordinate system on the basis of the signal acquired from the sun sensor.

The ideal attitude calculator 24 calculates an ideal attitude of the geostationary satellite 1 from the ideal thrust direction and the direction of the sun. In detail, the ideal attitude calculator 24 calculates the ideal attitude of the geostationary satellite 1 from the ideal thrust direction and the unit vector $s_B$.

The actual attitude calculator 25 acquires a signal from the sensor unit 29, which includes a magnetic sensor, a gyro sensor, and other sensors installed in the geostationary satellite 1, and calculates an actual attitude of the geostationary satellite 1 on the basis of the signal acquired from the sensor unit 29.

The movement limitation determiner 27 determines a movement limitation defined by the capacities of the attitude control actuators 14. In this embodiment, the movement limitation indicates the upper limit $\omega_{MAX}$ of the absolute value of the angular rate of the geostationary satellite 1 that can be achieved by the attitude control actuators 14.

The target attitude calculator 26 acquires the actual attitude of the geostationary satellite 1 from the actual attitude calculator 25, acquires the ideal attitude of the geostationary satellite 1 from the ideal attitude calculator 24, and acquires the movement limitation of the attitude control actuators 14 from the movement limitation determiner 27. On the basis of the actual and ideal attitudes of the geostationary satellite 1 and the movement limitation of the attitude control actuators 14, the target attitude calculator 26 calculates a target attitude that is the attitude of the geostationary satellite 1 to be achieved.

The torque calculator 28 acquires the actual attitude of the geostationary satellite 1 from the actual attitude calculator 25, acquires the target attitude of the geostationary satellite 1 from the target attitude calculator 26, and calculates a torque for making the attitude of the geostationary satellite 1 coincide with the target attitude. The torque calculator 28 then transmits a torque instruction indicating the calculated torque to the attitude control actuators 14. The attitude control actuators 14 control the attitude of the geostationary satellite 1 mechanically in accordance with the torque instruction.

Figure 4:
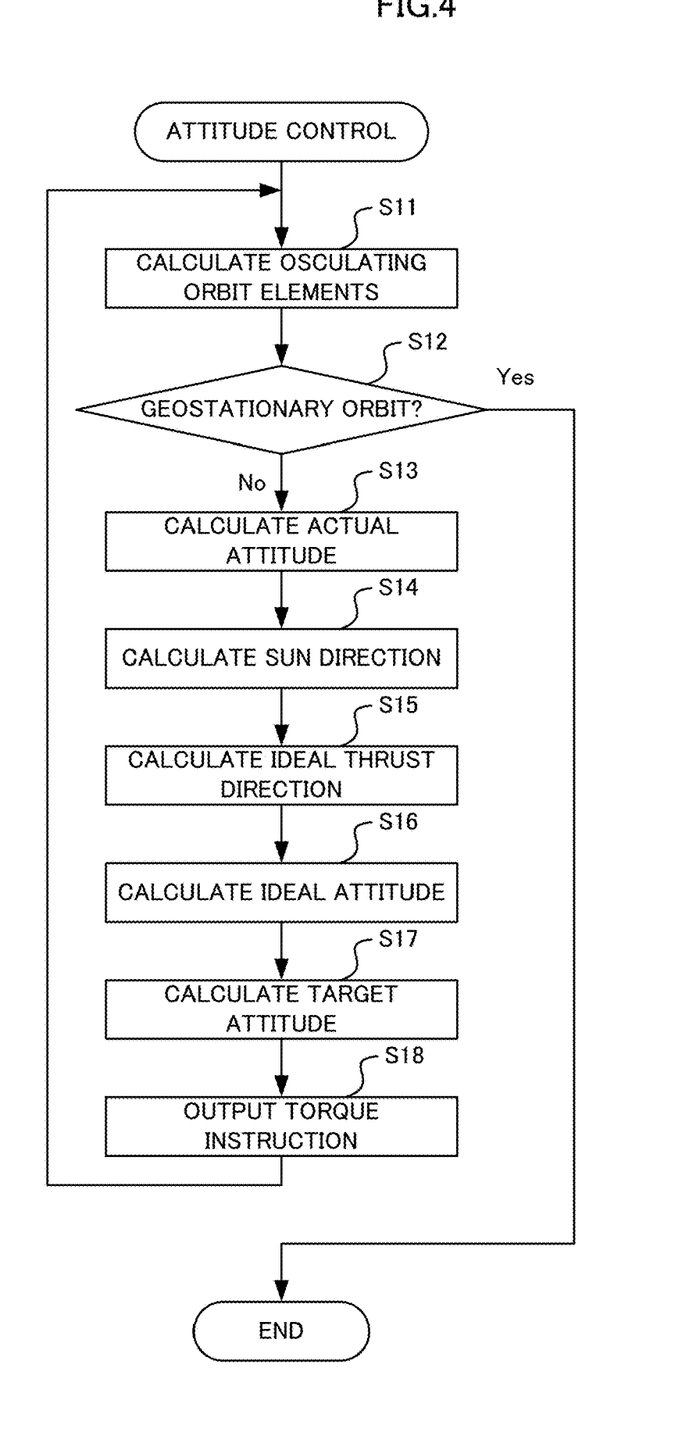
FIG. 4 is a flowchart illustrating an example of attitude control operation executed by the attitude control apparatus according to Embodiment 1.

A process of controlling the attitude of the geostationary satellite 1 executed by the attitude control apparatus 20 having the above-described configuration is explained with reference to FIG. 4. The attitude control apparatus 20 makes the panel surface 12*a* of the solar panel 12 orthogonal to the direction of the sun, that is, the unit vector $s_B$, and then executes the attitude control process illustrated in FIG. 4. The attitude control apparatus 20 executes the attitude control process in a time interval T1 to control the attitude control actuators 14, so that the attitude control actuators 14 control the attitude of the geostationary satellite 1 mechanically in the constant time interval. The time interval T1 is a period of several seconds to several minutes, for example.

The orbit calculator 21 calculates osculating orbit elements of the geostationary satellite 1 (Step S11). In detail, the orbit calculator 21 calculates the osculating orbit elements of the geostationary satellite 1 at a time $t_k$ and transmits the calculated osculating orbit elements to the ideal thrust direction calculator 22. The individual components of the attitude control apparatus 20 execute processes in synchronization with the clock signal having the time interval T1 output from a non-illustrated oscillator circuit. When the osculating orbit elements calculated in Step S11 are equal to the osculating orbit elements of a geostationary orbit (Step S12; Yes), the attitude control apparatus 20 terminates the attitude control process.

When the osculating orbit elements calculated in Step S11 are not equal to the osculating orbit elements of the geostationary orbit (Step S12; No), the actual attitude calculator 25 calculates an actual attitude of the geostationary satellite 1 in the geocentric inertial coordinate system on the basis of the signal acquired from an attitude sensor included in the sensor unit 29 (Step S13). In detail, the actual attitude calculator 25 calculates a matrix $C_{BkI}$ representing the actual attitude that is the attitude of the geostationary satellite 1 in the geocentric inertial coordinate system. The actual attitude calculator 25 then transmits the matrix $C_{BkI}$ to the target attitude calculator 26 and the torque calculator 28.

The sun direction calculator 23 calculates a direction of the sun as viewed from the geostationary satellite 1 in the satellite coordinate system on the basis of the signal acquired from the sun sensor included in the sensor unit 29 (Step S14). In detail, the sun direction calculator 23 calculates a unit vector $s_B$ indicating the direction of the sun in the satellite coordinate system on the basis of the signal acquired from the sun sensor. The sun direction calculator 23 then transmits the unit vector $s_{Bk}$ indicating the direction of the sun calculated at the time $t_k$ to the ideal attitude calculator 24 and the target attitude calculator 26.

The ideal thrust direction calculator 22 calculates an ideal thrust direction in the satellite coordinate system from the osculating orbit elements calculated in Step S11 (Step S15). In detail, the ideal thrust direction calculator 22 calculates weight coefficients from the difference of the osculating orbit elements calculated by the orbit calculator 21 at the time $t_k$ from the target orbit elements, and calculates the sum of the results of multiplication of the direction vectors providing the maximum change rates of the individual orbit elements by the weight coefficients, thereby calculating an ideal thrust direction $u_{k+1}{}^d$ in the satellite coordinate system at the time $t_{k+1}$ for minimizing the propellant consumption. The ideal thrust direction calculator 22 then transmits the calculated ideal thrust direction $u_{k+1}{}^d$ to the ideal attitude calculator 24. The time $t_{k+1}$ is represented by the expression (1) below using the time $t_k$ and the time interval T1:

$$t_{k+1}=t_k+T1 \tag{1}$$

The ideal attitude calculator 24 calculates an ideal attitude of the geostationary satellite 1 in the geocentric inertial coordinate system from the ideal thrust direction calculated in Step S15 and the direction of the sun calculated in Step S14 (Step S16). In detail, the ideal attitude calculator 24 calculates the ideal attitude of the geostationary satellite 1 from the ideal thrust direction $u_{k+1}{}^d$ at the time $t_{k+1}$ and the unit vector $s_{Bk}$. The respective unit vectors corresponding to the $x_B$ axis, the $y_B$ axis, and the $z_B$ axis in the satellite coordinate system in the case where the attitude of the geostationary satellite 1 coincides with the ideal attitude at the time $t_{k+1}$ are represented by $x_{Bk+1}{}^d$, $y_{Bk+1}{}^d$, and $z_{Bk+1}{}^d$. Since the $z_B$ axis aligns with the ideal thrust direction in the ideal attitude as described above, the $z_B$ axis is represented by the expression (2) below:

$$z_{Bk+1}{}^d u_{k+1}{}^d \tag{2}$$

In addition, the panel surface 12a is orthogonal to the unit vector $s_B$ in the ideal attitude. The direction of the sun at the time $t_{k+1}$ can be regarded to be identical to the direction of the sun at the time $t_k$ regardless of changes in the position and the attitude of the geostationary satellite 1 during the time interval T1, because of the extremely long distance between the geostationary satellite 1 and the sun. That is, the unit vector $y_{Bk+1}{}^d$ corresponding to the $y_B$ axis that is the rotational axis of the solar panel 12 can be regarded as orthogonal to the unit vector $z_{Bk+1}{}^d$ and the direction of the sun $s_{Bk}$. Accordingly, the unit vector $y_{Bk+1}{}^d$ is represented by the expression (3) below:

[Math 1]

$$y_{B_{k+1}}^d \leftarrow \frac{z_{B_{k+1}}^d \times s_{B_k}}{|z_{B_{k+1}}^d \times s_{B_k}|} \tag{3}$$

Because the satellite coordinate system is a right-handed orthogonal coordinate system, the unit vector $x_{Bk+1}{}^d$ is represented by the expression (4) below:

$$x_{Bk+1}{}^d = y_{Bk+1}{}^d \times z_{Bk+1}{}^d \tag{4}$$

A matrix $C_{Bk+1}{}^d{}_I$ is defined in the expression (5) below, which represents the unit vectors $x_{Bk+1}{}^d$, $y_{Bk+1}{}^d$, and $z_{Bk+1}{}^d$ of the above expressions (2) to (4) in the geocentric inertial coordinate system. The term $[x_{Bk+1}{}^d]_I$ in the expression (5) indicates the unit vector $x_{Bk+1}{}^d$ represented in the geocentric inertial coordinate system. Also, the term $[y_{Bk+1}{}^d]_I$ indicates the unit vector $y_{Bk+1}{}^d$ represented in the geocentric inertial coordinate system, and the term $[z_{Bk+1}{}^d]_I$ indicates the unit vector $z_{Bk+1}{}^d$ represented in the geocentric inertial coordinate system. The ideal attitude calculator 24 transmits the matrix $C_{Bk+1}{}^d{}_I$ to the target attitude calculator 26.

$$C_{Bk+1}{}^d{}_I = [[x_{Bk+1}{}^d]_I, [y_{Bk+1}{}^d]_I, [z_{Bk+1}{}^d]_I] \tag{5}$$

The target attitude calculator 26 calculates a target attitude of the geostationary satellite 1 in the geocentric inertial coordinate system from the actual and ideal attitudes of the geostationary satellite 1 and the movement limitation of the attitude control actuators 14 (Step S17). In detail, the target attitude calculator 26 calculates the target attitude from the matrix $C_{Bk+1}{}^d{}_I$, the matrix $C_{BkI}$, the unit vector $s_{Bk}$, and the upper limit $\omega_{MAX}$ of the absolute value of the angular rate. The calculated target attitude preferably has a minimum deviation from the ideal attitude. The target attitude calculator 26 thus calculates a transformation matrix from the ideal attitude of the geostationary satellite 1 at the time $t_{k+1}$ to the target attitude of the geostationary satellite 1 at the time $t_{k+1}$, and minimizes the trace of the transformation matrix. The target attitude calculator 26 thus calculates the target attitude having the minimum deviation from the ideal attitude. The specific calculation process is explained.

The transformation matrix $C_{BkBk+1}{}^d$ is defined in the expression (6) below, which represents vector transformation from the ideal attitude of the geostationary satellite 1 at the time $t_{k+1}$ to the actual attitude of the geostationary satellite 1 at the time $t_k$. In the expression (6), $C_{IBk+1}{}^d$ indicates a transposed matrix of the matrix $C_{Bk+1}{}^d{}_I$.

$$C_{BkBk+1}{}^d = C_{BkI} C_{IBk+1}{}^d \tag{6}$$

The transformation matrix $C_{Bk+IBk}$ from the actual attitude of the geostationary satellite 1 at the time $t_k$ to the target attitude of the geostationary satellite 1 at the time $t_{k+1}$ is defined in the expression (7) below. The right-hand side of the expression (7) indicates conducting a turn about the unit vector $s_{Bk}$ by an angle $\theta$ and then conducting a turn about the $y_B$ axis by an angle $\varphi$, thereby making the attitude of the geostationary satellite 1 coincide with the target attitude. In the expression (7), $C_2(\varphi)$ is a coordinate transformation matrix indicating a turn about the $y_B$ axis by the angle $\varphi$. In the expression (7), $E_3$ is a three-dimensional identity matrix, $s_{Bk}{}^T$ is a transposed matrix of the $s_{Bk}$, and $s_{Bk}{}^x$ is a cross-product matrix of the $s_{Bk}$.

[Math 2]

$$C_{B_{k+1}B_k} = C_2(\phi)\{\cos\theta E_3 + (1-\cos\theta)s_{B_k}s_{B_k}{}^T - \sin\theta s_{B_k}{}^x\} \tag{7}$$

While the orbital period of the geostationary satellite 1 is approximately 12 to 24 hours, the time interval T1 is several seconds to several minutes. The angles $\theta$ and $\varphi$ can thus be regarded as extremely small values. The above expression (7) can therefore be approximated by the expression (8) below. In the expression (8), $e_2$ is a matrix defined by $[0\ 1\ 0]^T$. In the expression (8), the transformation matrix $C_{Bk+IBk}$ is represented by a linear combination of the angles $\theta$ and $\varphi$.

[Math 3]

$$C_{B_{k+1}B_k} \approx E_3 - (\phi e_2 + \theta s_{B_{k-1}})^x \tag{8}$$

The transformation matrix $C_{Bk+IBk+1}{}^d$ from the ideal attitude of the geostationary satellite 1 at the time $t_{k+1}$ to the target attitude of the geostationary satellite 1 at the time $t_{k+1}$ is defined in the expression (9) below.

[Math 4]

$$C_{B_{k+1}B_{k+1}}{}^d = C_{B_{k+1}B_k} C_{B_kB_{k+1}}{}^d \tag{9}$$

The above expression (9) represents a deviation from the ideal attitude of the geostationary satellite 1. Accordingly, the target attitude closest to the ideal attitude of the geostationary satellite 1 can be obtained by calculating angles $\theta$ and $\varphi$ that provide the minimum trace of the transformation matrix $C_{Bk+IBk+1}{}^d$ in the expression (9) while satisfying the expression (10) below based on the upper limit $\omega_{MAX}$ of the absolute value of the angular rate.

[Math 5]

$$\sqrt{\varphi^2+\theta^2} \leq T1\omega_{MAX} \quad (10)$$

On the right-hand side of the above expression (9), the transformation matrix $C_{Bk+IBk}$ is a linear combination of the angles $\theta$ and $\varphi$. On the right-hand side of the expression (9), the transformation matrix $C_{BkBk+1}{}^d$ is the product of the matrix $C_{BkI}$ representing actual attitude of the geostationary satellite 1 at the time $t_k$ and the transposed matrix $C_{IBk+1}{}^d$ of the matrix $C_{Bk+1}{}^d{}_I$ representing ideal attitude of the geostationary satellite 1 at the time $t_{k+1}$, as defined in the above expression (6). The transformation matrix $C_{Bk+IBk+1}{}^d$ is therefore a linear combination of the angles $\theta$ and $\varphi$. That is, the target attitude calculator 26 calculates the target attitude by solving the mathematical programming problem of minimizing the trace of the transformation matrix $C_{Bk+IBk+1}{}^d$, which is an evaluation function configured by a linear combination of the angles $\theta$ and $\varphi$, under the quadratic constraint represented by the above expression (10). This configuration does not require a process of repetitively execute calculations while changing a variable, for example, for solving the mathematical programming problem, and can therefore improve the efficiency of calculating the target attitude.

The solutions of the angles $\theta$ and $\varphi$ obtained by solving the above-explained mathematical programming problem are defined as $\theta^*$ and $\varphi^*$, respectively. The transformation matrix from the actual attitude of the geostationary satellite 1 at the time $t_k$ to the target attitude of the geostationary satellite 1 at the time $t_{k+1}$, obtained by substituting the angles $\theta^*$ and $\varphi^*$ in the above expression (7), is defined as $C_{B^*k+IBk}$. The matrix $C_{B^*k+1I}$ indicating the target attitude of the geostationary satellite 1 in the geocentric inertial coordinate system at the time $t_{k+1}$ is represented by the expression (11) below. The target attitude calculator 26 then transmits the matrix $C_{B^*k+1I}$ indicating the calculated target attitude to the torque calculator 28.

[Math 6]

$$C_{B^*k+1I} = C_{B^*k+1Bk} C_{BkI} \quad (11)$$

The attitude control apparatus 20 that executes the above-explained process makes the panel surface 12a of the solar panel 12 orthogonal to the direction of the sun at the start of attitude control. As in the above expression (7), the attitude control from the actual attitude of the geostationary satellite 1 at the time $t_k$ to the target attitude of the geostationary satellite 1 at the time $t_{k+1}$ is achieved by a turn about the unit vector $s_{Bk}$ and a turn about the $y_B$ axis. That is, the panel surface 12a of the solar panel 12 is maintained to be orthogonal to the direction of the sun in the attitude control during the transfer from the GTO to the GEO. This configuration can prevent a reduction in power generation efficiency of the solar panel 12 during the orbit transfer. Furthermore, the attitude of the geostationary satellite 1 is made to coincide with the target attitude having a minimum deviation from the ideal attitude of the geostationary satellite 1 in association with the ideal thrust direction that is an optimum thrust direction of the thruster 11 for minimizing the propellant consumption during the transfer from the GTO to the GEO. This configuration can minimize the propellant consumption during the orbit transfer.

The torque calculator 28 calculates a torque required for turning the geostationary satellite 1 from the actual attitude to the target attitude on the basis of the actual attitude of the geostationary satellite 1 calculated in Step S13 and the target attitude of the geostationary satellite 1 calculated in Step S17. The torque calculator 28 then outputs a torque instruction indicating the required torque to the attitude control actuators 14 (Step S18). In detail, the torque calculator 28 calculates the torque for making the attitude of the geostationary satellite 1 coincide with the target attitude at the time $t_{k+1}$ from the matrix $C_{BkI}$ representing the actual attitude of the geostationary satellite 1 and the matrix $C_{B^*k+1I}$ indicating the target attitude of the geostationary satellite 1. The torque calculator 28 transmits the torque instruction indicating the calculated torque to the attitude control actuators 14.

The attitude control actuators 14 control the attitude of the geostationary satellite 1 mechanically in accordance with the torque instruction. The mechanical control of the attitude control actuators 14 over the attitude of the geostationary satellite 1 in accordance with the torque instruction changes the orientation of the geostationary satellite 1, so that the attitude of the geostationary satellite 1 coincides with the target attitude. The attitude control apparatus 20 executes the above-explained process repetitively in the time interval T1 until arrival of the geostationary satellite 1 at the GEO.

As described above, the attitude control apparatus 20 according to Embodiment 1 calculates a target attitude that is the attitude of the geostationary satellite 1 in which a deviation from the ideal attitude is minimized within the movement limitation of the attitude control actuators 14 while the panel surface 12a faces the sun preferably while the $y_B$ axis that is the rotational axis extends in the direction orthogonal to the sun direction $s_B$. Transmitting to the attitude control actuators 14 a torque instruction indicating the torque for turning the geostationary satellite 1 from the actual attitude to the calculated target attitude makes the attitude of the geostationary satellite 1 coincide with the target attitude, thereby preventing a reduction in power generation efficiency of the solar panel 12 during the transfer from the GTO to the GEO. In the above-explained process of calculating the target attitude, calculated is the target attitude having the minimum deviation from the ideal attitude of the geostationary satellite 1 in association with the ideal thrust direction that is an optimum thrust direction of the thruster 11 for minimizing the propellant consumption during the transfer from the GTO to the GEO. This configuration can minimize the propellant consumption during the orbit transfer.

Embodiment 2

The above-explained process of calculating the target attitude by the target attitude calculator 26 is a mere example. Although the geostationary satellite 1 and the attitude control apparatus 20 according to Embodiment 2 have the same configurations as those according to Embodiment 1, these embodiments have differences in the processes executed by the target attitude calculator 26 and the movement limitation determiner 27.

The movement limitation determiner 27 determines a maximum angular momentum envelope surface, which indicates a collection of maximum angular momenta that can be generated by the control moment gyros or reaction wheels serving as the attitude control actuators 14. The movement limitation determiner 27 then transmits the maximum angular momentum envelope surface to the target attitude calculator 26. The following is an additional description about the maximum angular momentum envelope surface. In general, when a certain direction is designated in a satellite coordinate system, the angular momentum that can be generated by each of the attitude control actuators 14 in the designated direction is uniquely determined. The sum of such momenta provides the maximum angular momenta that can be generated by all the attitude control actuators 14 in the designated direction. The surface defined by these maximum angular momenta is called a maximum angular momentum envelope surface.

The target attitude calculator 26 calculates a target attitude from the matrix $C_{Bk+1}{}^d_I$, the matrix $C_{BkI}$, the unit vector $s_{Bk}$, and the maximum angular momentum envelope surface. The calculated target attitude preferably has a minimum deviation from the ideal attitude. The target attitude calculator 26 thus calculates a transformation matrix from the ideal attitude of the geostationary satellite 1 at the time $t_{k+1}$ to the actual attitude of the geostationary satellite 1 at the time $t_k$, and then solves the inverse kinematics problem of the transformation matrix, thereby obtaining an ideal rotational angle $\theta^d$ about the unit vector $s_{Bk}$ and an ideal rotational angle $\varphi^d$ about the $y_B$ axis. The target attitude calculator 26 then calculates a target attitude defined by angles $\theta$ and $\varphi$ close to the ideal rotational angles $\theta^d$ and $\varphi^d$.

The operation of the target attitude calculator 26 is explained in more detail. The target attitude calculator 26 solves the inverse kinematics problem of the transformation matrix $C_{BkBk+1}{}^d$ represented by the above expression (6), and thereby obtains the ideal rotational angle $\theta^d$ about the unit vector $s_{Bk}$ and the ideal rotational angle $\varphi^d$ about the $y_B$ axis.

Regarding a turn from the actual attitude of the geostationary satellite 1 at the time $t_k$ to the ideal attitude of the geostationary satellite 1 at the time $t_{k+1}$, a theoretical optimum rotational axis $[\rho^d]_{Bk}$ regardless of the movement limitation of the attitude control actuators 14 is defined in the expression (12) below. The rotational axis $[\rho^d]_{Bk}$ is defined in the satellite coordinate system.

$$[\rho^d]_{Bk} = \varphi^d e_2 + \theta_{dSBk} \quad (12)$$

The target attitude calculator 26 calculates an upper limit $h_{max}$ of the angular momentum of a turn of the geostationary satellite 1 about the rotational axis $[\rho^d]_{Bk}$ that can be achieved by the attitude control actuators 14, on the basis of the maximum angular momentum envelope surface. The target attitude calculator 26 calculates an upper limit $\omega_{MAX}$ of the absolute value of the angular rate of the geostationary satellite 1 about the rotational axis $[\rho^d]_{Bk}$ that can be achieved by the attitude control actuators 14 as in the expression (13) below. In the expression (13), $I_B$ indicates the inertia matrix of the geostationary satellite 1. The inertia matrix $I_B$ of the geostationary satellite 1 has three rows and three columns, contains a moment of inertia of the geostationary satellite 1 at the diagonal elements, and a product of inertia at the off-diagonal elements.

$$\omega_{MAX} = h_{max}/|I_B[\rho^d]_{Bk}| \quad (13)$$

The target attitude calculator 26 then calculates angles $\theta$ and $\varphi$ having minimum deviations from the ideal rotational angle $\theta^d$ about the unit vector $s_{Bk}$ and the ideal rotational angle $\varphi^d$ about the $y_B$ axis, respectively, while satisfying the above expression (10), and thereby obtains the target attitude closest to the ideal attitude of the geostationary satellite 1. The angles $\theta$ and $\varphi$ obtained as explained above are defined as $\theta^*$ and $\varphi^*$, respectively. The transformation matrix from the actual attitude of the geostationary satellite 1 at the time $t_k$ to the target attitude of the geostationary satellite 1 at the time $t_{k+1}$, obtained by substituting the angles $\theta^*$ and $\varphi^*$ in the above expression (7), is defined as $C_{B^*k+1Bk}$. The matrix $C_{B^*k+1I}$ indicating the target attitude of the geostationary satellite 1 in the geocentric inertial coordinate system at the time $t_{k+1}$ is represented by the above expression (11). The target attitude calculator 26 then transmits the calculated matrix $C_{B^*k+1I}$ indicating the target attitude to the torque calculator 28.

As in Embodiment 1, the attitude control apparatus 20 that executes the above-explained process makes the panel surface 12a of the solar panel 12 orthogonal to the direction of the sun at the start of attitude control. As in the above expression (7), the attitude control from the actual attitude of the geostationary satellite 1 at the time $t_k$ to the target attitude of the geostationary satellite 1 at the time $t_{k+1}$ is achieved by a turn about the unit vector $s_{Bk}$ and a turn about the $y_B$ axis. That is, the panel surface 12a of the solar panel 12 is maintained to be orthogonal to the direction of the sun in the attitude control during the transfer from the GTO to the GEO. This configuration can prevent a reduction in power generation efficiency of the solar panel 12 during the orbit transfer. Furthermore, the attitude of the geostationary satellite 1 is made to coincide with the target attitude having a minimum deviation from the ideal attitude of the geostationary satellite 1 in association with the ideal thrust direction that is an optimum thrust direction of the thruster 11 for minimizing the propellant consumption during the transfer from the GTO to the GEO. This configuration can minimize the propellant consumption during the orbit transfer.

As described above, the attitude control apparatus 20 according to Embodiment 2 turns the geostationary satellite 1 about the ideal rotational axis at an angular rate in view of the movement limitation of the attitude control actuators 14, and thus makes the attitude of the geostationary satellite 1 coincide with the target attitude. This configuration can prevent a reduction in power generation efficiency of the solar panel 12 during the transfer from the GTO to the GEO. Since the movement limitation of the attitude control actuators 14 regarding a turn about the ideal rotational axis is taken into consideration, the angular momenta that can be generated by the attitude control actuators 14 can be maximized even in a geostationary satellite 1 in which the principal axis of inertia providing the maximum second moment of inertia differs from the principal axis of inertia providing the minimum second moment of inertia, for example. In addition, the target attitude having the minimum deviation from the ideal attitude of the geostationary satellite 1 in association with the ideal thrust direction (optimum thrust axis of the thruster 11 for minimizing the propellant consumption during the orbit transfer and minimizing the time required for the transfer). This configuration can minimize the propellant consumption during the orbit transfer.

Figure 5:
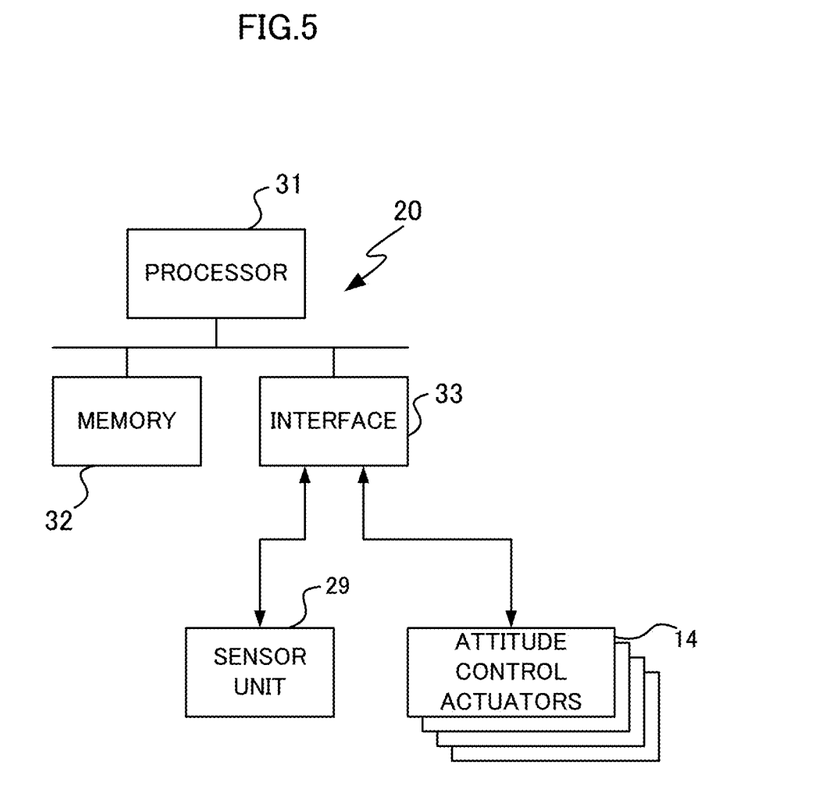
FIG. 5 illustrates a hardware configuration of the attitude control apparatus according to the embodiments.

FIG. 5 illustrates a hardware configuration of the attitude control apparatus according to the embodiments. The attitude control apparatus 20 has a hardware configuration for controlling the individual components, which includes a processor 31, a memory 32, and an interface 33. The functions of these components can be performed when the processor 31 executes the program stored in the memory 32. The interface 33 connects the individual components to each other to establish communication. The interface 33 may be replaced with multiple types of interfaces as required. Although FIG. 5 illustrates an example in which the attitude control apparatus 20 includes the single processor 31 and the single memory 32, the attitude control apparatus 20 may include a plurality of processors 31 and a plurality of memories 32. In this case, the processors 31 and the memories 32 perform the individual functions in cooperation with each other. The attitude control apparatus 20 is connected via the interface 33 to the sensor unit 29 and the attitude control actuators 14.

Furthermore, the above-illustrated hardware configuration and flowchart are a mere example and may be modified and corrected in any manner.

The center for executing the control process, which includes the processor 31, the memory 32, and the interface 33, may be configured by a general computer system without a dedicated system. The computer program for executing the above operations may be stored into a non-transitory computer-readable recording medium, such as a flexible disk, a compact disc read-only memory (CD-ROM), or a digital versatile disc read-only memory (DVD-ROM), or may be stored into a storage device on a communication network. In this case, the computer program stored in the non-transitory recording medium or the storage device is installed into a computer, and thereby causes the computer to function as the attitude control apparatus 20 for executing the above process.

The above-described embodiments of the disclosure should not be construed as limiting the disclosure. The initial orbit, into which the geostationary satellite 1 separated from the rocket is introduced, may be an orbit other than the GTO. For example, the geostationary satellite 1 may be introduced into a low earth orbit (LEO), a super synchronous orbit (SSO), or other orbits. The attitude control apparatus 20 may conduct attitude control of a satellite other than the geostationary satellite 1. For example, the attitude control apparatus 20 may control the attitude of a non-geostationary satellite that shifts from the initial orbit to a geocentric orbit. In this case, the target orbit is not the GEO but any geocentric orbit. The geostationary satellite 1 may include a plurality of thrusters 11. In this case, the $z_B$ axis in the satellite coordinate system indicates a synthetic thrust axis formed by synthetizing the individual thrust axes of the thrusters 11. The thruster 11 may also be a chemical thruster.

The above-described embodiments provide a mere example of the configuration of the attitude control apparatus 20 and the operations of the individual components. The attitude control apparatus 20 may be installed in a ground station. The sun direction calculator 23 may calculate a direction of the sun from the solar calendar. The attitude control apparatus 20 may exclude the movement limitation determiner 27, and the target attitude calculator 26 may retain the movement limitation of the attitude control actuators 14 in advance. The ideal thrust direction calculator 22 may calculate the optimum thrust direction of the thruster 11 for minimizing the propellant consumption during the transfer from the orbit including the geostationary satellite 1 to the GEO and minimizing the time required for the transfer. This configuration can minimize the propellant consumption during the transfer and minimize the time required for the transfer.

The thruster controller may provide the thruster 11 with a thruster instruction value for varying the discharge amount from the thruster 11 during the transfer from the GTO to the GEO.

The above-described definition of the satellite coordinate system is a mere example. The satellite coordinate system may be any coordinate system, in which the $y_B$ axis indicating the rotational axis of the solar panel 12 extends in a predetermined direction relative to the $z_B$ axis indicating the ideal thrust direction.

The above-described movement limitation of the attitude control actuators 14 is a mere example and may be replaced with the upper limit of the rotational rate of flywheels or reaction wheels serving as the attitude control actuators 14. In Embodiment 2, the movement limitation of the attitude control actuators 14 may be the upper limit of the absolute value of the angular rate of the geostationary satellite 1 that can be achieved by the attitude control actuators 14, as in Embodiment 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-177919, filed on Sep. 21, 2018, the entire disclosure of which is incorporated by reference herein.

REFERENCE SIGNS LIST

1 Geostationary satellite
2 Earth
11 Thruster
12 Solar panel
12a Panel surface
13 Support member
14 Attitude control actuator
20 Attitude control apparatus
21 Orbit calculator
22 Ideal thrust direction calculator
23 Sun direction calculator
24 Ideal attitude calculator
25 Actual attitude calculator
26 Target attitude calculator
27 Movement limitation determiner
28 Torque calculator
29 Sensor unit
31 Processor
32 Memory
33 Interface

The invention claimed is:
1. An attitude control apparatus comprising:
non-transitory computer-readable memory; and
a processor operatively coupled to the non-transitory computer-readable memory and configured to
acquire a position of a satellite comprising a thruster and a solar panel, and calculate an ideal thrust direction that is a thrust direction of the thruster to minimize a propellant consumption in firing of the thruster during transfer of the satellite to a target orbit, the solar panel comprising a panel surface rotatable about a rotational axis;
calculate an ideal attitude that is an attitude of the satellite in which the panel surface faces the sun while the thrust direction aligns with the ideal thrust direction;
acquire a movement limitation of an attitude control actuator that controls an attitude of the satellite mechanically, and calculate a target attitude, which is an attitude of the satellite in which a deviation from the ideal attitude is minimized within the acquired movement limitation of the attitude control actuator while the panel surface faces the sun, and which is calculated based on the acquired movement limitation of the attitude control actuator;

acquire an actual attitude that is an attitude of the satellite;

calculate a torque to turn the satellite from the actual attitude to the target attitude; and transmit a torque instruction indicating the calculated torque to the attitude control actuator to turn the satellite from the actual attitude to the target attitude.

2. The attitude control apparatus according to claim 1, wherein the processor calculates the ideal attitude that is the attitude in which the rotational axis extends in a direction orthogonal to a direction of the sun while the thrust direction aligns with the ideal thrust direction.

3. The attitude control apparatus according to claim 2, wherein the processor calculates the target attitude that is the attitude of the satellite in which the deviation from the ideal attitude is minimized within the movement limitation while the rotational axis extends in the direction orthogonal to the direction of the sun.

4. The attitude control apparatus according to claim 1, wherein
the rotational axis extends in a direction orthogonal to the thrust direction, and
the processor calculates a rotational angle about a direction of the sun and a rotational angle about the rotational axis from the actual attitude to minimize the deviation from the ideal attitude within the movement limitation, and thereby calculates the target attitude that is the attitude achieved by a turn about the direction of the sun by the calculated rotational angle about the direction of the sun and a turn about the rotational axis by the calculated rotational angle about the rotational axis from the actual attitude.

5. The attitude control apparatus according to claim 4, wherein the processor calculates a transformation matrix representing a turn from the ideal attitude to the target attitude, using the rotational angle about the direction of the sun and the rotational angle about the rotational axis from the actual attitude as variables, and calculates the rotational angle about the direction of the sun and the rotational angle about the rotational axis from the actual attitude to minimize a trace of the transformation matrix within the movement limitation, and thereby calculates the target attitude.

6. The attitude control apparatus according to claim 4, wherein the processor
calculates a transformation matrix representing a turn from the ideal attitude to the actual attitude,
solves an inverse kinematics problem of the transformation matrix, and thereby calculates an ideal rotational angle about the direction of the sun and an ideal rotational angle about the rotational axis from the actual attitude, and
calculates a rotational angle about the direction of the sun and a rotational angle about the rotational axis from the actual attitude having minimum deviations from the ideal rotational angle about the direction of the sun and the ideal rotational angle about the rotational axis from the actual attitude within the movement limitation, and thereby calculates the target attitude.

7. The attitude control apparatus according to claim 1, wherein the movement limitation of the attitude control actuator indicates an upper limit of an absolute value of an angular rate of a geostationary satellite that is achievable by the attitude control actuator.

8. A satellite comprising:
a thruster;
a solar panel comprising a panel surface rotatable about a rotational axis; and
the attitude control apparatus according to claim 1.

9. A method of controlling attitude executed by an attitude control apparatus, the method comprising:
calculating an ideal thrust direction that is a thrust direction of a thruster of a satellite to minimize a propellant consumption in firing of the thruster during transfer of the satellite to a target orbit, the satellite comprising the thruster and a solar panel comprising a panel surface rotatable about a rotational axis;
calculating an ideal attitude that is an attitude of the satellite in which the panel surface faces the sun while the thrust direction aligns with the ideal thrust direction;
calculating a target attitude, which is an attitude of the satellite in which a deviation from the ideal attitude is minimized within an acquired movement limitation of an attitude control actuator that controls an attitude of the satellite mechanically while the panel surface faces the sun, based on the acquired movement limitation of the attitude control actuator;
calculating a torque to turn the satellite from an actual attitude to the target attitude; and
transmitting a torque instruction indicating the calculated torque to the attitude control actuator to turn the satellite from the actual attitude to the target attitude, the actual attitude being an attitude of the satellite.

10. A non-transitory computer-readable storage medium having stored thereon instructions that, when executed by one or more processors, causes the one or more processors to perform a method comprising:
acquiring a position of a satellite comprising a thruster and a solar panel, and calculating an ideal thrust direction that is a thrust direction of the thruster to minimize a propellant consumption in firing of the thruster during transfer of the satellite to a target orbit, the solar panel comprising a panel surface rotatable about a rotational axis;
calculating an ideal attitude that is an attitude of the satellite in which the panel surface faces the sun while the thrust direction aligns with the ideal thrust direction;
acquiring a movement limitation of an attitude control actuator that controls an attitude of the satellite mechanically;
calculating a target attitude, which is an attitude of the satellite in which a deviation from the ideal attitude is minimized within the acquired movement limitation while the panel surface faces the sun, based on the acquired movement limitation of the attitude control actuator;
acquiring an actual attitude that is an attitude of the satellite;
calculating a torque to turn the satellite from the actual attitude to the target attitude, and
transmitting a torque instruction indicating the calculated torque to the attitude control actuator to turn the satellite from the actual attitude to the target attitude.

11. The method according to claim 9, wherein the ideal attitude, which is the attitude in which the rotational axis extends in a direction orthogonal to a direction of the sun, is calculated while the thrust direction aligns with the ideal thrust direction.

12. The method according to claim 11, wherein the target attitude, which is the attitude of the satellite in which the deviation from the ideal attitude is minimized within the movement limitation, is calculated while the rotational axis extends in the direction orthogonal to the direction of the sun.

13. The method according to claim 9, wherein
the rotational axis extends in a direction orthogonal to the thrust direction, and
the method further comprises calculating a rotational angle about a direction of the sun and a rotational angle about the rotational axis from the actual attitude to minimize the deviation from the ideal attitude within the movement limitation, and thereby calculating the target attitude that is the attitude achieved by a turn about the direction of the sun by the calculated rotational angle about the direction of the sun and a turn about the rotational axis by the calculated rotational angle about the rotational axis from the actual attitude.

14. The method according to claim 13, further comprising calculating a transformation matrix representing a turn from the ideal attitude to the target attitude, using the rotational angle about the direction of the sun and the rotational angle about the rotational axis from the actual attitude as variables, and calculating the rotational angle about the direction of the sun and the rotational angle about the rotational axis from the actual attitude to minimize a trace of the transformation matrix within the movement limitation, and thereby calculating the target attitude.

15. The method according to claim 13, further comprising:
calculating a transformation matrix representing a turn from the ideal attitude to the actual attitude;
solving an inverse kinematics problem of the transformation matrix, and thereby calculating an ideal rotational angle about the direction of the sun and an ideal rotational angle about the rotational axis from the actual attitude; and
calculating a rotational angle about the direction of the sun and a rotational angle about the rotational axis from the actual attitude having minimum deviations from the ideal rotational angle about the direction of the sun and the ideal rotational angle about the rotational axis from the actual attitude within the movement limitation, and thereby calculating the target attitude.

16. The method according to claim 9, wherein the movement limitation of the attitude control actuator indicates an upper limit of an absolute value of an angular rate of a geostationary satellite that is achievable by the attitude control actuator.

17. The non-transitory computer-readable storage medium according to claim 10, wherein
the ideal attitude, which is the attitude in which the rotational axis extends in a direction orthogonal to a direction of the sun, is calculated while the thrust direction aligns with the ideal thrust direction, and
the target attitude, which is the attitude of the satellite in which the deviation from the ideal attitude is minimized within the movement limitation, is calculated while the rotational axis extends in the direction orthogonal to the direction of the sun.

18. The non-transitory computer-readable storage medium according to claim 10, wherein
the rotational axis extends in a direction orthogonal to the thrust direction, and
the method further comprises calculating a rotational angle about a direction of the sun and a rotational angle about the rotational axis from the actual attitude to minimize the deviation from the ideal attitude within the movement limitation, and thereby calculating the target attitude that is the attitude achieved by a turn about the direction of the sun by the calculated rotational angle about the direction of the sun and a turn about the rotational axis by the calculated rotational angle about the rotational axis from the actual attitude.

19. The non-transitory computer-readable storage medium according to claim 18, wherein the method further comprises calculating a transformation matrix representing a turn from the ideal attitude to the target attitude, using the rotational angle about the direction of the sun and the rotational angle about the rotational axis from the actual attitude as variables, and calculating the rotational angle about the direction of the sun and the rotational angle about the rotational axis from the actual attitude to minimize a trace of the transformation matrix within the movement limitation, and thereby calculating the target attitude.

20. The non-transitory computer-readable storage medium according to claim 18, wherein the method further comprises:
calculating a transformation matrix representing a turn from the ideal attitude to the actual attitude;
solving an inverse kinematics problem of the transformation matrix, and thereby calculating an ideal rotational angle about the direction of the sun and an ideal rotational angle about the rotational axis from the actual attitude; and
calculating a rotational angle about the direction of the sun and a rotational angle about the rotational axis from the actual attitude having minimum deviations from the ideal rotational angle about the direction of the sun and the ideal rotational angle about the rotational axis from the actual attitude within the movement limitation, and thereby calculating the target attitude.

* * * * *